April 21, 1970     R. FINKEL     3,507,056

EDUCATIONAL DISPLAY CASE

Filed Nov. 15, 1967

*INVENTOR.*
RICHARD FINKEL
BY

*Robert J. Schuller*
ATTORNEY

United States Patent Office 3,507,056
Patented Apr. 21, 1970

3,507,056
EDUCATIONAL DISPLAY CASE
Richard Finkel, Newton, Mass., assignor of one-half to Bernard T. Sendor, Westbury, and Mortimer S. Sendor, Queens Village, N.Y.
Filed Nov. 15, 1967, Ser. No. 683,243
Int. Cl. G09b 1/28
U.S. Cl. 35—60
10 Claims

ABSTRACT OF THE DISCLOSURE

An educational display case formed of a pair of identical hexahedrons each having two faces that are trapezoidal in parallel planes while the other faces are rectangular, clamps being provided for nesting the hexahedrons so as to form a rectanguloid case. A pair of the opposed rectangular faces of each hexahedron are provided as sliding panels which can be reversed, and the panel surfaces have a variety of finishes and are of a variety of materials to provide flexibility in the use of display materials. The interior of each hexahedron is preferably compartmented for storage of materials and devices intended for display on the panels.

---

This invention relates to an educational display, and more particularly to a novel, portable educational display case.

Educational display panels have been variously formed, but typically are large devices, clumsy to move, and commonly are mounted within a frame and supported by two or more legs. Other common embodiments of display panels are permanently wall-mounted, such as blackboards used in a classroom. Typically too, the educational material used in conjunction with the display is often stored in an area remote to the display, thereby often requiring an inordinate amount of time to retrieve the stored material and set-up the display, and to store the material after use. Previous display panels, in addition, usually make use of but one display technique, i.e., a backboard is used as a writing surface and seldom serves other purposes.

Accordingly, a principal object of the present invention is to provide a novel, compact and portable display case.

Another object is to provide a portable display case which can be adapted for use with several display techniques.

Yet another object is to provide a portable display case in which the educational display material used in the course of instruction is stored wholly within the case itself.

A specific object is to provide a portable display case in which at least one side wall of the case is releasably and reversibly attached to the case and in which at least one face of each releasable side wall forms a display surface.

Another specific object is to provide a compact, portable display case containing at least one reversible and removable side wall and a flexible display surface which can be progressively advanced across the outside of that side wall.

The foregoing and other objects are preferably achieved by providing two identical hollow sections which are releasably coupled to form a substantially rectanguloid case. Each of the two identical sections has a substantially rectangular cross section, and is rigidly formed by connecting two side walls with a top and a bottom surface. Each identical section is open at both ends. The two sections are reversibly coupled along the side walls so that the top surface of one section and the bottom surface of the other section are coplanar.

Flat, preferably rigid display panels, each substantially the size of a corresponding open end, are releasably mounted across each corresponding open end, each panel thus providing at least one and preferably two display surfaces and also serving to enclose the case. Means are preferably included for mounting these panels so that the panels are reversible.

Shelves, partitions, or the like are preferably provided to divide the space within each hollow section, as desired. These partitioned interiors serve to store the educational material used in conjunction with the display panels. A handle is added to the case for ease of carrying.

In one embodiment of the present invention, storage means such as one or more rollers are mounted within at least one section. Flexible material is wound on or attached to the rollers so that one side of the material, forming a display surface, can be progressively advanced across the outside of a display panel by rotation of the rollers.

Other objects and many of the attendant advantages of the present invention will be appreciated from the following detailed description which is to be considered together with the accompanying drawings wherein.

Figure 1:
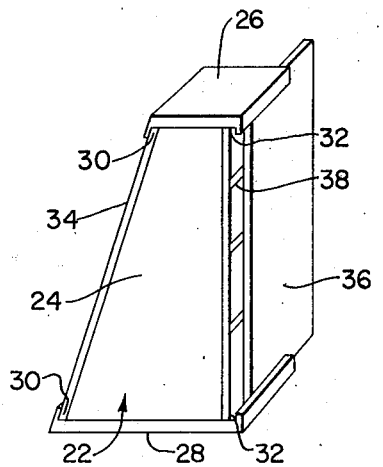
FIG. 1 is a perspective drawing of one of two identical sections of the preferred embodiment of a portable educational display case.
Figure 2:
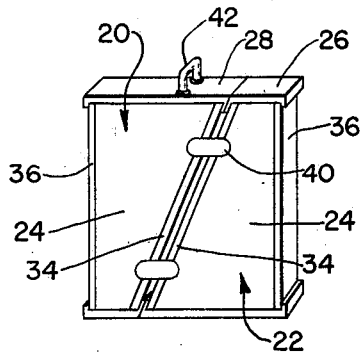
FIG. 2 is a perspective view of the preferred embodiment of a display case, where two identical sections are shown coupled together.

With reference to the drawings, there is shown in FIGS. 1 and 2, exemplary forms of the present invention comprising one of the two identical sections, designated section 20 and a matching section 22. Section 22 as shown in FIG. 1 is exemplary of both sections, and comprises two identical side walls 24 (only one shown) each taking the shape, in the preferred embodiment, of approximately truncated right angle triangles; a top surface 26; and a bottom surface 28. Surface 28 is larger in area than surface 26, and both are substantially rectangular.

Side walls 24 are rigidly connected to top surface 26 and bottom surface 28 so as to form a structure having a substantially rectangular cross section. A rigid material such as wood, plastic, cardboard, or the like is used to form the side walls 24, top surface 26, and bottom surface 28. For ease of assembly, the same material preferably is used for all surfaces, however, more than one material may be used if desired. Section 22 therefore has a pair of open ends, and has at least one and preferably two pairs 30 and 32 of channels, each pair being mounted at and extending across a corresponding open end of the section. One channel of each pair is adjacent top surface 26 and the other adjacent bottom surface 28 so that the recessed portion of each one channel faces the other. Display panels 34 and 36 are respectively mounted within channel pairs 30 and 32, preferably for sliding movement between the recessed portions. Alternatively, channels 30 and 32 can be replaced by clasps, buckles, clips, pins, or like means for releasably and reversibly holding the panels 34 and 36 across the open ends of section 22.

Each display panel is flat, preferably rigid, and is substantially the same size as the corresponding open end across which it is attached. Each display panel is intended to serve one or more display purposes, such as a blackboard, bulletin board, projection screen, or the like, by having at least one, but preferably both of its faces functioning as display surfaces.

The form of the panel's surfaces, or the material from which the panel is formed, determines the manner in which it can be used. For example, the panel can be opaque, with a surface having a beaded, reflective coating and thus serve as a projection screen. A section can serve as a light box or tracing screen, in which instance the display panel can be translucent with a frosted surface. An opaque panel with a rough surface constitutes a blackboard. When at least one surface of a panel is smooth, self-adhesive forms can be applied by pressure. Thin magnetic shapes can be applied when at least one of the panel's surfaces is magnetic. A surface of cloth material of closely woven fabric containing myriad small hooks allows a shape or cutout containing a mating fabric with myriad small loops to be attached. A board with some other form of fabric surface permits pins or tacks to be inserted into the surface and the panel becomes a bulletin board. It should be emphasized that a panel can have a different finish on each surface and can thus function as two or more types of display panels, for example, as a magnetic board on one side and a blockboard on the opposite side. These two sides can be reversed simply by sliding out the panel and reinserting it in the guides in reverse order.

Moreover, it should be noted that since the case as shown in FIG. 2 is formed of two sections, both sections when disconnected can be used side-by-side so that adjacent panels together form a large display surface, i.e. by using side-by-side two panels having a beaded, reflective finish, a large projection screen can be created.

One or more shelves 38, bins, boxes, or similar partitioning means divide the space within each section into discrete compartments for containing and storing the various educational materials which are to be used with the display case. These partitioning means can be fixedly mounted within the case, or releasably attached so that the size and shape of the compartments can be altered as desired.

As previously noted section 20 is substantially a duplicate of section 22. As shown in FIG. 2, buckles 40, mounted to side walls 24 are provided, in a preferred embodiment, for releasably coupling the two sections. Part of each buckle 40 is attached to section 20 on one of side walls 24 and a mating portion of the buckle is attached to section 22 on a corresponding one of side walls 24. Although, two buckles are shown it is obvious that the two sections also can be coupled through the use of any desired number of buckles, and that the buckles can be replaced by clamps, hinges, clasps, clips, or like means for releasably coupling the two sections. It is desirable, of course, that the buckles or other coupling means be designed so that display panels 34, which are face-to-face when the sections are nested, can be freely slidable within each corresponding pair of channels 30. This can be accomplished by several methods, for example by having the coupling members constructed so that one or more mating members fold back against side walls 24 or pivot away from the side walls thereby leaving exposed the ends of channels 30.

For ease of carrying, one or more handles such as 42 attached to the bottom surface of section 20 in a location substantially at the center of the coupled case, as shown in FIG. 2, permits the case to be readily lifted. Handle 42 preferably is recessed within the bottom surface 28 so that it reciprocally moves from a position flush or just below surface 28 to a raised position where it can be hand gripped. Thus, when the coupled case is not being carried, the handle will not extend above the bottom surface. Alternatively, the handle or handles can be rigidly or pivotally attached to the surfaces 28, but because such handles will remain raised above the surface, legs or similar projections should be mounted adjacent thereto so that the case will rest evenly when placed on a flat supporting surface.

Figure 3:
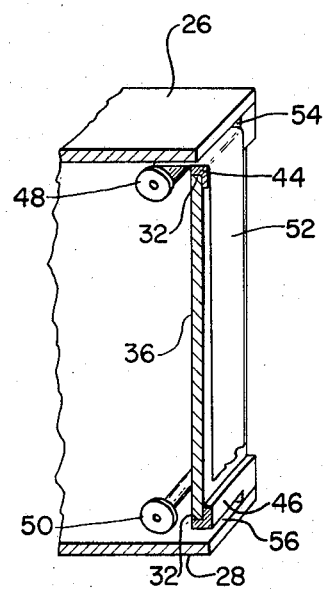
FIG. 3 is a perspective close-up, partly in section and partly broken away, showing a segment of one embodiment of a roller-wound, progressively advanced display surface.

In FIG. 3 another embodiment of a section of the invention again comprises top and bottom surfaces 26 and 28, a pair of grooves 32 one adjacent each of the top and bottom surfaces, and panel 36 releasably and slidably mounted in grooves 32. As shown, grooves 32 are formed in part by rails 44 and 46 mounted respectively on surfaces 26 and 28. The devices of FIG. 3 includes a pair of rollers 48 and 50 mounted for rotation within the section adjacent surfaces 26 and 28 respectively as by suspension from appropriate brackets (not shown) anchored to surfaces 26 and 28. Rollers 48 and 50 have their axes of rotation disposed parallel to one another and to rails 44 and 46.

An elongated sheet 52 of flexible material, e.g. paper, synthetic plastics or the like, which can be marked with ink, crayon or other common marking substances, is connected at opposite ends to rollers 48 and 50 so that the latter then function as storage or sheet advancing means or both.

Slot 54 is provided through rails 44 between surfaces 26 and the portion of rail 44 in contact with panel 36. Similarly, slot 56 is provided through rail 46 between surface 28 and the portion of rail 46 in contact with the panel. Both slots are somewhat longer than the width of sheet 52. Thus, sheet 52 extends from roller 48 through slot 54 and outwardly of rail 44, turning across rail 44 and extending over panel 36 to rail 46 whence the sheet passes through slot 56 to roller 50. The sheet being longer than the path from roller to roller, the excess material is stored on one or the other of the rollers and can be advanced between the rollers by rotation of the latter.

Alternatively, the sheets can be stored on but one roller so that one end of the sheet is free; thus, the sheet can be unrolled across panel 36 and snubbed or releasably affixed adjacent the opposite side of the panel. In such instance, the one roller preferably is spring-loaded so that it can release or rewind the sheet much as a standard windowshade is released and rewound. Whether one or more rollers are provided, it will be seen that the structure is such that the presence of sheet 52 across panel 36 does not prevent one from moving or removing the latter.

Sheet 52, as previously stated, is preferably a paper or plastic material which can be written or printed upon by a common marking substance. Thus, written matter can be prepared in advance on a roll and displayed when desired; or the roll can serve as a "lesson pad" on which writing can be retained as a permanent record and displayed at a later date. Photographs or drawings also can be projected onto the sheet where they can be traced and again kept as a permanent record.

Further, the sheet 52 can cooperate with the associated display board or panel 36 so that the two provide a novel display. For example, a chart or map can be displayed on the sheet 52, and the display board can be of a ferromagnetic material. This permits magnetic markers, normally stored in a section, to be temporarily affixed to the surface of the flexible map.

Although not shown, the rollers can be driven manually or automatically. For example, a hand crank can be used to advance sheet 52 or an electric motor or similar drive with suitable start-stop switches and speed control mechanism can also be incorporated within the case to rotate the rollers.

The invention as described and illustrated has several advantages over previous, commonly-used types of display devices. Because the display case in the present invention is compact, it can easily be carried from one location to another and can be used equally well in the office, conference room, workshop, or classroom. When not in use the case can be stored in a minimum of space. Multiplicity of display techniques is of obvious cost significance, as is the case's modular construction. Changing a display technique requires only the replacement of a display board or the reversal of the board being used. Moreover, the case is a complete unit, containing all the required teaching display material and display boards.

It is to be understood that the invention, as detailed above, is not limited in its application to the details of construction and arrangement. For example, more than a single channel pair can be provided adjacent an open end of the section such as 22, so that more than one display panel can be mounted simultaneously across that end. In such an instance a plurality of panels can be held in stacked, parallel relation, closely adjacent one another. Such an arrangement will provide a very wide selection of panel colors, surface textures and the like, conveniently and quickly.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:
1. A portable educational display case comprising:
   a first hollow structure having a top surface, a bottom surface, and two sides rigidly connected to said top and bottom surfaces to form a structure having a substantially rectangular cross section open at opposite ends, said side walls being substantially truncated right-angled triangles and said top and bottom surfaces being substantially rectangles;
   a first pair of removable display panels each shaped substantially the same as the cross-section of a corresponding open end of said first structure;
   means for slidably and reversibly mounting each of said first pair of display panels across a corresponding open end of said first structure;
   a second hollow structure having a top surface, a bottom surface, and two side walls connected to said top and bottom surfaces to form a structure having a substantially rectangular cross section open at opposite ends, said side walls being substantially truncated right-angle triangles and said top and bottom surfaces being substantially rectangles;
   a second pair of removable display panels each shaped substantially the same as the cross section of a corresponding open end of said second structure;
   means for reversibly and slidably mounting each of said second display panels across a corresponding open end of said second structure; and
   means for releasably coupling said first and second structures with the top of one structure being coplanar with the bottom of the other structure and the corresponding sloping side walls forming a common surface so that said structures, when coupled, form a substantially open ended rectanguloid with a display panel of each pair forming one of two outer walls thereof.

2. A display case as defined in claim 1, in which said top surfaces, bottom surfaces, said walls and said display panels are formed of a substantially rigid material.

3. A case as defined in claim 1 in which at least one surface of at least one of said display panels has a smooth gloss finish.

4. A case as defined in claim 1 in which at least one surface of at least one of said display panels has a matte finish.

5. A case as defined in claim 1 in which at least one surface of at least one of said display panels is formed of ferromagnetic material.

6. A case as defined in claim 1 including means for dividing the space within at least one of said structures into discrete storage compartments.

7. A case as defined in claim 1 in which said means for reversibly and slidably mounting each of said display panels across said corresponding open end of the respective structure comprises at least one pair of parallel channels disposed at opposite sides of said corresponding open end of said structure, so that said display panel can be slidably mounted within said pair of channels.

8. A case as defined in claim 1 including:
   an elongated flexible sheet of material
   at least one storage device for releasably storing said sheet and being mounted within one of said structures adjacent one of said open ends of said structure and
   means permitting said sheet to extend from said storage device to the outside of said structure so that said sheet can be advanced from said storage device and over the outside of said display panel.

9. A case as defined in claim 1 in which said means for mounting said panels comprises at least one pair of parallel channels disposed at each open end of each of said structures, the spacing between each channel of each pair being such that a respective display panel can be slidably mounted within each of said pair of channels.

10. A case as defined in claim 9 in which said spacing between each pair of channels is substantially the same and in which said display panels are substantially of an identical cross section so that any of said panels can be slidably mounted between any of said pairs of channels.

References Cited

UNITED STATES PATENTS

| 1,505,803 | 8/1924  | Pylick      | 35—60 X |
| 1,604,631 | 10/1926 | Bruner      | 129—1   |
| 1,668,378 | 5/1928  | Pickett     | 40—64   |
| 2,726,460 | 12/1955 | Jecmen      | 35—62   |
| 3,339,297 | 9/1967  | Stinn et al.| 35—73   |
| 3,414,987 | 12/1968 | Lindenauer  | 35—60   |

EUGENE R. CAPOZIO, Primary Examiner

H. S. SKOGQUIST, Assistant Examiner

U.S. Cl. X.R.

40—64